(12) United States Patent
Choi

(10) Patent No.: US 6,826,659 B2
(45) Date of Patent: Nov. 30, 2004

(54) DIGITAL DATA PROCESSING SYSTEM

(75) Inventor: Kwang-Ju Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 10/002,583

(22) Filed: Nov. 1, 2001

(65) Prior Publication Data

US 2002/0133677 A1 Sep. 19, 2002

(30) Foreign Application Priority Data

Mar. 14, 2001 (KR) ........................................ 2001-13091

(51) Int. Cl.[7] .............................................. G06F 12/00
(52) U.S. Cl. ........................ 711/152; 711/163; 711/167; 365/195; 365/226
(58) Field of Search ................................. 365/194, 195, 365/196, 227, 228, 229; 711/152, 163, 167

(56) References Cited

U.S. PATENT DOCUMENTS

| | | | | |
|---|---|---|---|---|
| 5,900,008 A | * | 5/1999 | Akao et al. | .................. 711/100 |
| 5,963,467 A | * | 10/1999 | Miyatake et al. | ............ 365/149 |
| 5,991,207 A | * | 11/1999 | Sedlak et al. | ........... 365/189.01 |
| 6,026,029 A | * | 2/2000 | Dosaka et al. | ......... 365/189.01 |

\* cited by examiner

Primary Examiner—Donald Sparks
Assistant Examiner—Christian P. Chace
(74) Attorney, Agent, or Firm—F. Chau & Associates, LLC

(57) ABSTRACT

A digital data processing system minimizes overall power consumption in a system having embedding large capacity RAMs. Power consumption is reduced by establishing sufficient set-up times when driving plural RAM blocks that have been held in a standby state. A RAM access controller is interposed between an oscillator and the RAM blocks, and controls a master clock generated from the oscillator to secure setup times of the RAM blocks.

16 Claims, 3 Drawing Sheets

DIGITAL DATA PROCESSING SYSTEM

BACKGROUND OF THE INVENTION

1. Technical Field

The present invention generally relates to digital data processing systems and, more particularly, to digital data processing systems employing a plurality of RAM (Random Access Memory) blocks.

2. Description of Related Art

Data processing systems usually have storage components such as RAMs (dynamic RAMs (DRAMs) or static RAMs (SRAMs)). The RAMs are installed in a circuit board together with a microprocessor (or a microcontroller) in a digital data processing system. A large capacity RAM is divided into plural blocks of uniform memory capacities for operating at a high clock frequency.

Such systems having plural RAM blocks have been employed with an operational mechanism for operating at a high clock frequency in which RAM blocks in a standby state as well as RAM blocks in an operating state are put into a conductive state, to secure the minimum setup times necessary to make the standby RAM blocks operable in an operating state. As a result, there has been unnecessary power consumption in the system due to current through the standby RAM blocks. The rate of power consumption increases as the memory capacity of the RAM is increased.

Another conventional way to reduce unnecessary power consumption is to force RAM blocks that are not going to be used in an operation into a standby state. Therefore, setup times are required to operate newly selected RAM blocks in order to switch a memory access routine from the conductive RAM blocks in an operating state to the RAM blocks in a standby state. Securing the setup times is accomplished by controlling an operation speed of a microprocessor for a period of time when a signal for selecting a RAM block is active. Thus, a frequency-divided signal of a master clock provided from an oscillator is applied to the microprocessor. Consequently, the overall speed of a digital data processing system is degraded so that an operation speed of the microprocessor declines when a memory access routine switches from the RAM blocks in an operating state to the RAM blocks in a standby state.

SUMMARY OF THE INVENTION

To solve the above and other related problems of the prior art, there is provided a digital data processing system having plural RAM blocks. The digital data processing system according to the invention reduces overall power consumption as well as enhances operational efficiency without unnecessary power consumption.

According to an aspect of the present invention, there is provided a digital data processing system that comprises an oscillator, a plurality of memory blocks, a processor, and an access controller. The oscillator generates a clock signal with a predetermined frequency. The processor conducts access operations for the memory blocks in response to the clock signal. The access controller inhibits an access operation for a selected one of the plurality of memory blocks when the selected one of the plurality of memory blocks is being setup by the processor.

The present invention will be better understood from the following detailed description of the exemplary embodiment thereof taken in conjunction with the accompanying drawings, and its scope will be pointed out in the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

It should be understood that the description of the preferred embodiment is merely illustrative and that it should not be taken in a limiting sense. In the following detailed description, several specific details are set forth to provide a thorough understanding of the present invention.

Figure 1:
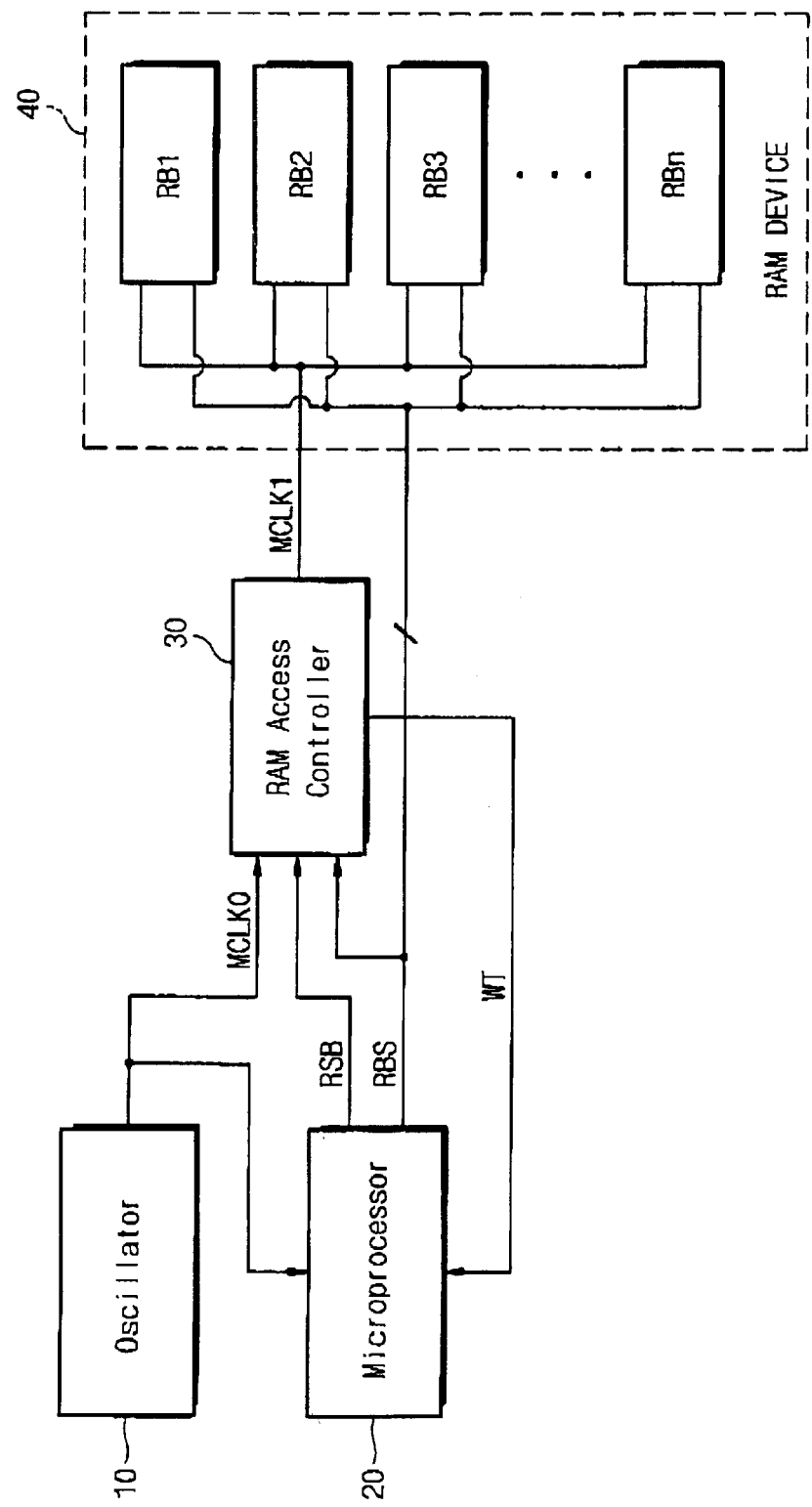
FIG. 1 is a block diagram of a digital data processing system, according to an illustrative embodiment of the present invention.

Referring to FIG. 1, a digital data processing system of the invention includes an oscillator 10, a microprocessor 20, a RAM access controller 30, and a RAM Device 40 that includes a plurality of RAM blocks RB1~RBn. The oscillator 10 generates a master clock MCLK0 having a predetermined cycle period. The RAM blocks RB1~RBn temporarily store and output data through write and read operations, being controlled by command signals provided from the microprocessor 20. The RAM blocks RB1~RBn are synchronously activated in response to an access clock MCLK1. In driving the RAM blocks RB1~RBn, only one of the RAM blocks is put into an active state by a RAM block selection signal RBS supplied through an external pin. Thus, the RAM blocks RB1~RBn are divided into a RAM block that is conductive and other RAM blocks that are in a standby state. For example, if the first RAM block RB1 is in an active state, other RAM blocks RB2~RBn are held in a standby state. The microprocessor 20 provides various control signals, here a reset signal RSB and the RAM block selection signal RBS, to the peripheral circuit blocks in response to the master clock MCLK0.

As used herein, the phrase "standby state" refers to the time period when an enable signal is being applied to a RAM block (with power being consumed by the RAM block), and data is still not applied to an output buffer. Moreover, as used herein, the phrase "active state" refers to the time period when an enable signal is not applied to a RAM block (and power is not being consumed by the RAM block), and a setup time is required in accordance with a selection signal supplied to the RAM block (that is in the standby state). The RAM block selection signal RBS acts as an enable signal for the RAM blocks RBP-RBn.

After being reset at an initial time in response to the reset signal RSB, the RAM access controller 30 generates the access clock MCLK1 in response to the RAM block selection signal RBS at every rising edge of the master clock MCLK0 provided from the oscillator 10. The RAM access controller 30, as well as supplying the access clock MCLK1 to a selected RAM block, also applies the wait signal WT to the microprocessor 20 to suspend an access from the microprocessor 20 while a RAM block being accessed is in a setup period.

Figure 2:
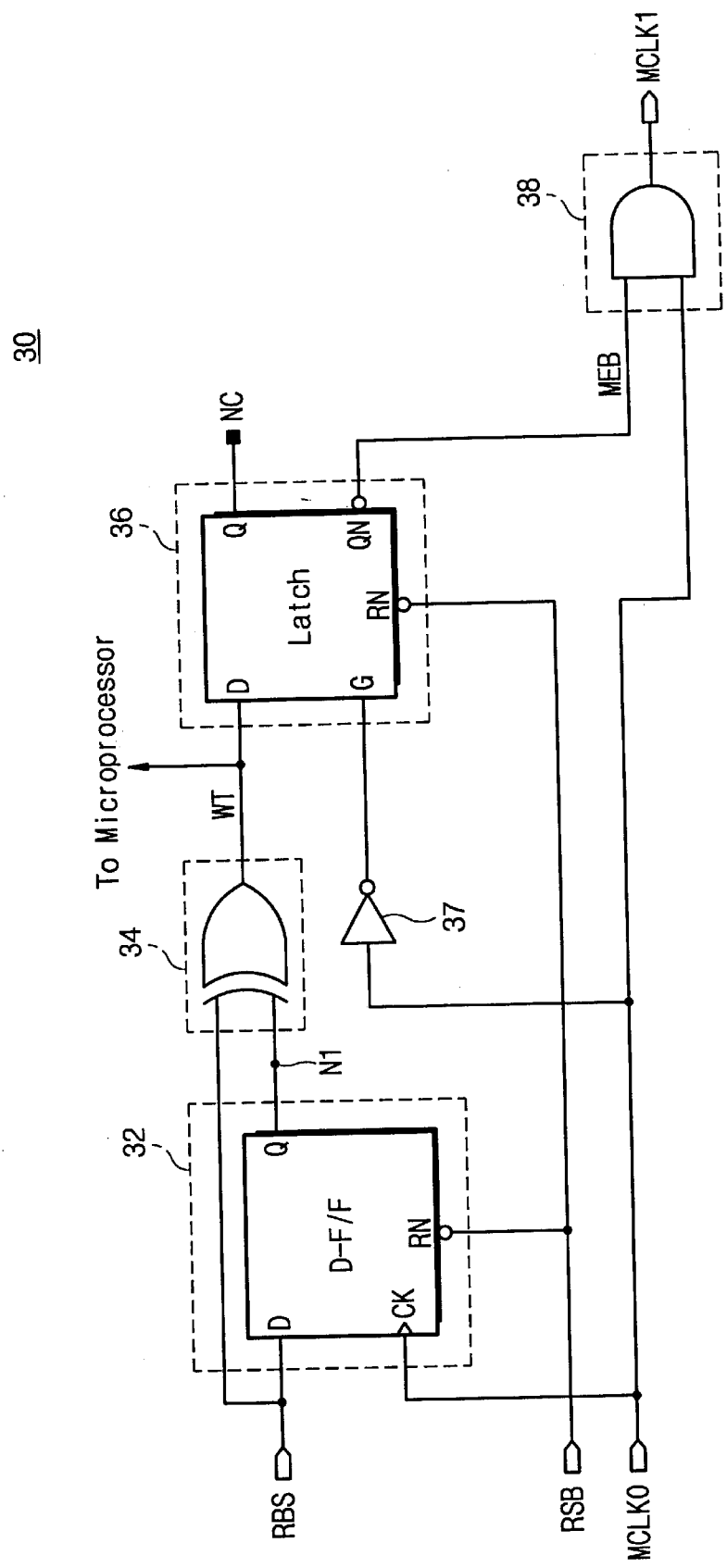
FIG. 2 is a circuit diagram of a RAM access controller shown in FIG. 1, according to an illustrative embodiment of the present invention.

Referring to FIG. 2, the RAM access controller 30 includes a data storage circuit 32 made of a D-flip/flop, a first logic circuit 34 made of an exclusive-OR gate, a data latch circuit 36, an inverter 37, and a second logic circuit 38 made of an AND gate.

Figure 3:
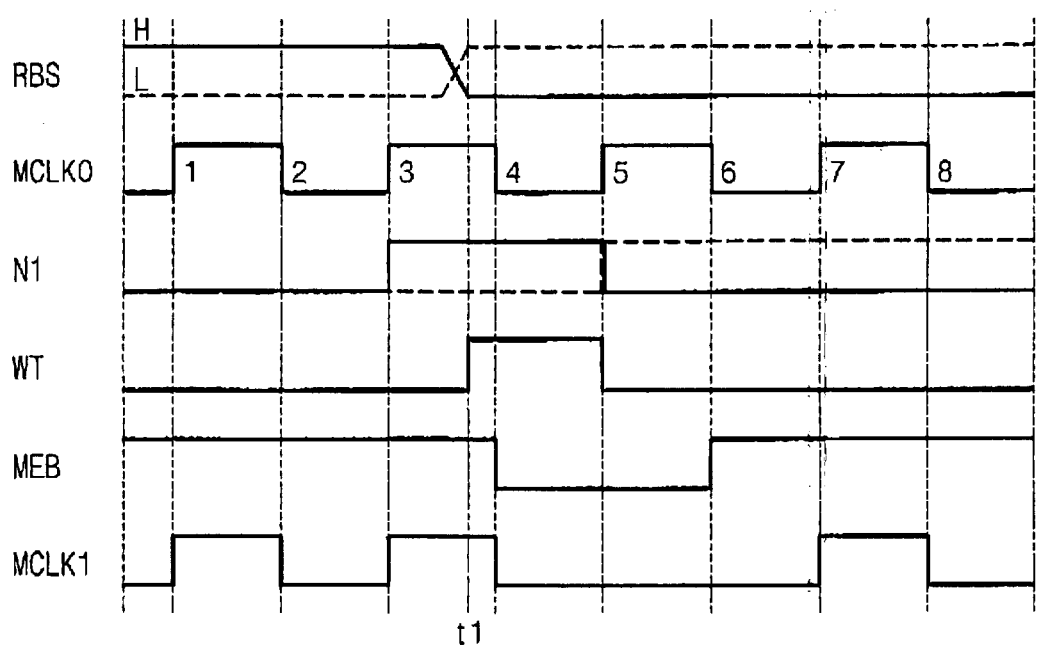
FIG. 3 is a timing diagram showing an operation of the RAM access controller of FIG. 2, according to an illustrative embodiment of the present invention.

The data storage circuit 32, after being reset at an initial state by the reset signal RSB, stores the RAM block selection signal RBS supplied through an input terminal D at every rising edge of the master cock MCLK0 and then generates an N1 signal shown in FIG. 3.

The first logic circuit 34 generates the wait signal WT shown in FIG. 3 in response to the RAM block selection signal RBS and an output signal provided from the data storage circuit 32. The inverter 37 converts a phase of the master clock MCLK0 into its reverse phase.

The data latch circuit 36, after being reset by the reset signal RSB at an initial state, holds the wait signal WT applied through an input terminal D for a low-level term of the master clock MCLK0 and generates a clock-masking signal MEB shown in FIG. 3. The second logic circuit 38 generates the access clock MCLK1 signal (shown in FIG. 3) which activates the RAM blocks RB1~RBn, in response to the clock-masking signal MEB and the master clock MCLK0.

Referring to the timing diagram of FIG. 3, first, the RAM access controller 30 is initiated by the reset signal RSB to set output terminals Qs of the data storage circuit 32 and the data latch circuit 36. Next, at a time t1, the RAM block selection signal RBS transitions to a low level to select one of the RAM blocks RB1~RBn.

The data storage circuit 32 receives data at every rising edge of the master clock MCLK0. That is, the rising edges 1, 3, 5, and 7 of the master clock MCLK0 control the data storage circuit 32 to store the RAM block selection signal RBS and generate the output signal N1. The RAM block selection signal RBS is held in the data storage circuit 32 during a cycle period from a rising edge to the next rising edge of the master clock MCLK0.

As the RAM block selection signal RBS is at a high level at the rising edge 1, the data storage circuit 32 stores the high-level RAM block selection signal RBS until the rising edge 3 and then generates the output signal N1 at a high-level. As the RAM block selection signal RBS is at a high level at the rising edge 3, the data storage circuit 32 stores the high-level RAM block selection signal RBS and generates the output signal N1 at a high level until the rising edge 5. However, as the RAM block selection signal RBS transitions to a low level after the rising edge 3, the data storage circuit 32 stores the low-level RAM block selection signal RBS until the rising edge 5, so that at the rising edge 5 the data storage circuit 32 generates the output signal N1 at a low level. As the RAM block selection signal RBS maintains a low level still at the rising edge 7, the data storage circuit 32 stores the low-level RAM block selection signal RBS and continuously generates a low-level output signal N1. As shown in FIG. 3, the data storage circuit 32 generates the output signal N1 that is delayed from the RAM block selection signal RBS by one cycle of the master clock MCLK0.

The first logic circuit 34 performs an exclusive-OR operation. The exclusive-OR gate outputs a high-level of the wait signal WT only when the RAM block selection signal RBS and the output signal N1 are at a high level and a low level, or at a low level and a high level, respectively. Thus, the wait signal WT is established in a low level except when either the block selection signal RBS or the output signal N1 is a low level (or a high level).

The data latch circuit 36 receives the wait signal WT during a low level of the master clock MCLK0, which is substantially an active state because it is applied through the inverter 37, and holds the low level therein during a high level of the master clock MCLK0. That is, the wait signal WT is input to the data latch circuit 36 during a low-level time period before the rising edge 1 and stored therein as a low level during a high-level time period from the rising edge 1 to a falling edge 2. Consequently, the data latch circuit 36 receives the wait signal WT at a low level during a time period from the falling edge 2 to the rising edge 3 and then stores the low-level wait signal during a high-level time period from the rising edge 3 to a falling edge 4. The data latch circuit 36 receives the wait signal WT at a high level during a time period from the falling edge 4 to the rising edge 5 and then stores the high-level wait signal during a high-level time period from the rising edge 5 to a falling edge 6. Consequently, the data latch circuit 36 receives the wait signal WT at a low level during a time period from the falling edge 6 to the rising edge 7 and then stores the low-level wait signal during a high-level time period from the rising edge 7 to a falling edge 8. It can be seen that, in FIG. 3, the data latch circuit 36 generates the wait signal WT through the output terminal Q, with a low level until the falling edge 4, a high level between the falling edge 4 and the rising edge 5, and a low level after the rising edge 5. The clock-masking signal MEB maintains a low level from the falling edges 4 to 6, and a high level during other time periods.

The second logic circuit 38 performs an AND operation. The AND gate generates a high level signal only when all input signals are high levels. Therefore, the access clock MCLK1 output from the second logic circuit 38 maintains a low level between the rising edge 5 and the falling edge 6, and is figured the same logic value as that of the master clock MCLK0 until the MEB and MCLK0 signals go low during the same time period.

The access clock MCLK1 generated from the RAM access controller 30 in response to the RAM block selection signal RBS and the master clock MCLK0 is activated in accordance with one cycle of the master clock MCLK0 after the RAM block selection signal RBS transitions to a low level at the time t1. The clock-masking signal MEB is active for a time period between the falling edges 4 and 6.

Returning to FIG. 1, the access clock MCLK1 generated from the RAM access controller 30 is applied to an alternative one of the RAM blocks RB1~RBn, which is selected by the RAM block selection signal RBS. Assuming that the RAM block selection signal RBS is applied to the RAM block RB2 in the state that the RAM block RB1 is active while the other RAM blocks RB2~RBn are inactive, the access clock MCLK1 and not the master clock MCLK0 is applied to the RAM block RB2 so as to secure a setup time to prepare an active operation of the RAM block RB2.

As seen from the aforementioned procedures and constructions, as the present invention places all of the RAM blocks except those that are active in a standby state and employs the access clock MCLK1 to activate the standby RAM blocks, the present invention reduces overall power consumption and secures a setup time for driving the standby RAM blocks when an access routine by the microprocessor switches the standby RAM blocks to active RAM blocks. While the access clock MCLK1 is later than the master clock MCLK0 in activating the next RAM block that transitions to an active state from a standby state, speed degradation will not occur because of the number of RAM blocks being held in a standby state.

As a result, regarding the conventional techniques wherein a number of RAM blocks including an active RAM block are forced to be in an active state and wherein RAM blocks other than the RAM blocks that are forced into an active state are situated in a standby state, an additional frequency division process needs to obtain a stable setup time for a RAM block to be accessed therein. Advantageously, the present invention provides a low power digital data processing system having a great storage capacity of RAMs.

Although the preferred embodiments of the present invention have been disclosed for illustrative purposes, those skilled in the art will appreciate that various modifications, additions and substitutions are possible, without departing from the scope and spirit of the invention as described in the accompanying claims. For instance, the invention would be advantageous to a digital data processing system including other kinds of storage device such as ROM (Read-Only Memory), as well as the aforementioned system with the RAMs.

What is claimed is:

1. A digital data processing system comprising:
   an oscillator for generating a clock signal with a predetermined frequency;
   a plurality of memory blocks;
   a processor for conducting access operations for the memory blocks in response to the clock signal, wherein the processor generates a memory block selection signal; and
   an access controller for inhibiting an access operation for a selected one of the plurality of memory blocks when the selected one of the plurality of memory blocks is being setup by the processor, wherein the access controller inhibits the access operation for the selected one of the memory blocks in response to the memory block selection signal at every rising edge of the clock signal.

2. The digital data processing system of claim 1, wherein the selected one of the plurality of memory blocks is active and other non-selected ones of the plurality of memory blocks are in a standby state.

3. The digital data processing system of claim 1, wherein the processor activates one of a plurality of memory block selection signals to select the selected one of the plurality of memory blocks, and the access controller detects an activation of the selected one of the plurality of memory blocks in response to the activated one of the plurality of memory block selection signals.

4. The digital data processing system of claim 3, wherein the access controller holds a transmission of the clock signal to the selected one of the plurality of memory blocks for a predetermined time period.

5. The digital data processing system of claim 3, wherein the access controller holds a transmission of the clock signal to the selected one of the plurality of memory blocks which is being setup.

6. The digital data processing system of claim 1, wherein the plurality of memory blocks is composed of read-only memories.

7. The digital data processing system of claim 1, wherein the plurality of memory blocks is composed of random-access memories.

8. The digital data processing system of claim 1, wherein the access controller comprises:
   a data storage circuit for generating an output signal at every rising edge of the clock signal in response to a memory block selection signal;
   a first logic circuit for generating a wait signal in response to the memory block selection signal and the output signal, the wait signal being applied to the processor;
   a data latch circuit for generating a clock-masking signal that is valid at every low-level term of the clock signal, in response to the wait signal; and
   a second logic circuit for generating an access clock in response to the clock signal and the clock-masking signal.

9. The digital data processing system of claim 8, wherein the data storage circuit generates the output signal that transitions to a low level at a rising edge of the clock signal after a logic level of the memory block selection signal has changed.

10. The digital data processing system of claim 8, wherein the first logic circuit generates the wait signal that transitions to a high level when a logic level of the memory block selection signal changes and generates the wait signal that transitions to a low level when the clock signal rises.

11. The digital data processing system of claim 10, wherein the first logic circuit comprises an exclusive-OR gate.

12. The digital data processing system of claim 8, wherein the data latch circuit generates the clock-masking signal that retains a low level for a cycle of the clock signal after a logic level of the memory block selection signal has changed.

13. The digital data processing system of claim 8, wherein the second logic circuit generates the access clock that is inactive for a cycle of the clock signal after a logic level of the memory block selection signal has changed, in response to a low level of the clock-masking signal.

14. The digital data processing system of claim 13, wherein the second logic circuit comprises an AND gate.

15. The digital data processing system of claim 8, wherein the data storage circuit comprises a D-flip/flop.

16. A digital data processing system comprising:
   an oscillator for generating a clock signal with a predetermined frequency;
   a plurality of memory blocks;
   a processor for conducting access operations for the memory blocks in response to the clock signal; and
   an access controller for inhibiting an access operation for a selected one of the plurality of memory blocks when the selected one of the plurality of memory blocks is being setup by the processor, wherein the access controller comprises:
      a data storage circuit for generating an output signal at every rising edge of the clock signal in response to a memory block selection signal;
      a first logic circuit for generating a wait signal in response to the memory block selection signal and the output signal, the wait signal being applied to the processor;
      a data latch circuit for generating a clock-masking signal that is valid at every low-level term of the clock signal, in response to the wait signal; and
      a second logic circuit for generating an access clock in response to the clock signal and the clock-masking signal.

* * * * *